(12) United States Patent
Keidar et al.

(10) Patent No.: US 8,094,628 B2
(45) Date of Patent: Jan. 10, 2012

(54) HALF-DUPLEX TERMINAL OPERATION IN A FULL-DUPLEX NETWORK

(75) Inventors: Ron Keidar, Haifa (IL); Liron Manor, Haifa (IL); Gilad Bornstein, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 705 days.

(21) Appl. No.: 11/739,029

(22) Filed: Apr. 23, 2007

(65) Prior Publication Data

US 2007/0248057 A1 Oct. 25, 2007

Related U.S. Application Data

(60) Provisional application No. 60/794,233, filed on Apr. 21, 2006.

(51) Int. Cl.
*H04J 3/00* (2006.01)

(52) U.S. Cl. ........ 370/337; 370/336; 370/436; 455/455; 455/518

(58) Field of Classification Search .................. None
See application file for complete search history.

(56) References Cited

U.S. PATENT DOCUMENTS

| 6,266,330 B1* | 7/2001 | Jokinen et al. ................. 370/329 |
| 2002/0118666 A1* | 8/2002 | Stanwood et al. ............. 370/345 |
| 2005/0136940 A1* | 6/2005 | An .................................. 455/455 |
| 2006/0116149 A1* | 6/2006 | Dunn et al. .................... 455/518 |
| 2006/0153101 A1* | 7/2006 | Raisanen ....................... 370/260 |
| 2007/0021132 A1* | 1/2007 | Jin et al. ......................... 455/518 |

* cited by examiner

*Primary Examiner* — Rafael Pérez-Gutiérrez
*Assistant Examiner* — Daniel Nobile
(74) *Attorney, Agent, or Firm* — James D. McFarland; Mary A. Fales

(57) ABSTRACT

A method for communication includes deploying a half-duplex terminal in a wireless full-duplex communication network configured to permit simultaneous transmission of downlink paging messages and uplink access messages between a base station and full-duplex mobile terminals in the network. The half-duplex terminal is assigned paging channel slots in a cyclical sequence of the paging channel slots, so that the base station transmits the downlink paging messages to the half-duplex terminal only during the assigned paging channel slots. The half-duplex terminal is controlled so that the half-duplex terminal transmits the uplink access messages only during an interval bounded by the assigned paging channel slots occurring in successive cycles in the sequence.

17 Claims, 1 Drawing Sheet

HALF-DUPLEX TERMINAL OPERATION IN A FULL-DUPLEX NETWORK

CROSS-REFERENCE TO RELATED APPLICATIONS

The present application claims priority to U.S. Provisional Patent Application Ser. No. 60/794,233, entitled, "HALF-DUPLEX TERMINAL OPERATION IN A FULL DUPLEX NETWORK" filed on Apr. 21, 2006, which is assigned to the assignee hereof and which is expressly incorporated herein by reference.

FIELD OF THE INVENTION

The present invention relates generally to wireless communication, and specifically to reducing the complexity and cost of wireless communication devices.

BACKGROUND OF THE INVENTION

Cellular communication networks are designed for full-duplex operation, in which terminals (such as cellular telephones) can both receive and transmit signals simultaneously. Cellular network standards thus assume terminals have full-duplex capability and permit simultaneous downlink and uplink transmissions to and from any given terminal. In other words, terminals must generally be capable of receiving and decoding a downlink signal from a base station in the course of making an uplink transmission.

Cellular push-to-talk (PTT) is a new class of mobile telephone service that enables instant one-to-one and one-to-many half-duplex communications on cellular telephones, emulating "walkie talkie" operation. In half-duplex operation, a terminal can either receive or transmit, but cannot both receive and transmit at the same time. An open PTT-over-cellular (PoC) standard is emerging under the auspices of the Open Mobile Alliance (OMA). Generally, PoC is implemented as an add-on feature of full-duplex cellular telephones and requires that participating telephones listen continuously for signals on a channel that is allocated for PTT service.

SUMMARY OF THE INVENTION

Half-duplex terminal operation is sufficient for many applications of wireless communication networks, particularly applications that involve only digital messaging and do not use voice channels. As noted above, however, commonly-deployed wireless networks, such as cellular networks, are configured for full-duplex operation and thus require terminals to support full-duplex standards. As full-duplex circuitry adds to the cost of the terminal, it would be desirable to produce a true half-duplex terminal that is nonetheless compatible with full-duplex network standards.

In some wireless networks, such as cellular networks, a base station may transmit a downlink paging message to a terminal in an assigned time slot. The terminal may also contact the base station by transmitting an uplink access message. Embodiments of the present invention enable a half-duplex terminal to operate in such a wireless network by ensuring that the terminal will transmit uplink access messages only during intervals between its assigned downlink paging time slots. Thus, the terminal will operate in transmit mode only during the intervals between paging time slots, and is available at all other times to receive downlink messages. This approach ensures that the half-duplex terminal will not miss any downlink paging messages sent by the base station, so that the paging and access channels can be used to carry data messages reliably in half-duplex mode. The base station, however, need not be aware that the terminal is not full-duplex enabled, and embodiments of the present invention can thus be implemented without changes to existing network infrastructure or standards.

There is therefore provided, in accordance with an embodiment of the present invention, a method for communication, including deploying a half-duplex terminal in a wireless full-duplex communication network, which is configured to permit simultaneous transmission of downlink paging messages and uplink access messages between a base station and full-duplex mobile terminals in the network; assigning to the half-duplex terminal paging channel slots in a cyclical sequence of the paging channel slots, so that the base station transmits the downlink paging messages to the half-duplex terminal only during the assigned paging channel slots; and controlling the half-duplex terminal so that the half-duplex terminal transmits the uplink access messages only during an interval bounded by the assigned paging channel slots occurring in successive cycles in the sequence.

In some embodiments, the paging messages and access messages are transmitted on signaling channels of the network, and the half-duplex terminal is configured to monitor the paging messages only during the assigned slots. Additionally or alternatively, controlling the half-duplex terminal includes transmitting a sequence of the uplink access messages separated by variable intervals, and determining the variable intervals responsively to the assigned paging channel slots.

In a disclosed embodiment, the communication network is configured to operate in accordance with a CDMA network standard.

There is also provided, in accordance with an embodiment of the present invention, a half-duplex wireless communication terminal for deployment in a wireless full-duplex communication network configured to permit simultaneous transmission of downlink paging messages and uplink access messages between a base station and full-duplex mobile terminals in the network, the terminal including a receiver operative to receive the downlink paging messages from the base station, a transmitter coupled in parallel with the receiver in a half-duplex configuration and is operative to the transmit uplink access messages to the base station, and a controller coupled to control the receiver so as to receive the downlink paging messages during assigned paging channel slots in a cyclical sequence of the paging channel slots during which the base station transmits the downlink paging messages to the terminal, and to control the transmitter so as to transmit the uplink access messages only during an interval bounded by the assigned paging channel slots occurring in successive cycles in the sequence.

There is additionally provided, in accordance with an embodiment of the present invention, a wireless communication network including a base station configured to simultaneously transmit downlink paging messages and receive uplink access messages to and from full-duplex mobile terminals in the network, and a terminal that includes a receiver operative to receive the downlink paging messages from the base station; a transmitter coupled in parallel with the receiver in a half-duplex configuration and is operative to transmit the uplink access messages to the base station, and a controller coupled to control the receiver so as to receive the downlink paging messages during assigned paging channel slots in a cyclical sequence of the paging channel slots during which the base station transmits the downlink paging messages to the terminal, and to control the transmitter so as to transmit the uplink access messages only during an interval bounded by the assigned paging channel slots occurring in successive cycles in the sequence.

The present invention will be more fully understood from the following detailed description of the embodiments thereof, taken together with the drawings in which:

DETAILED DESCRIPTION OF EMBODIMENTS

Figure 1:
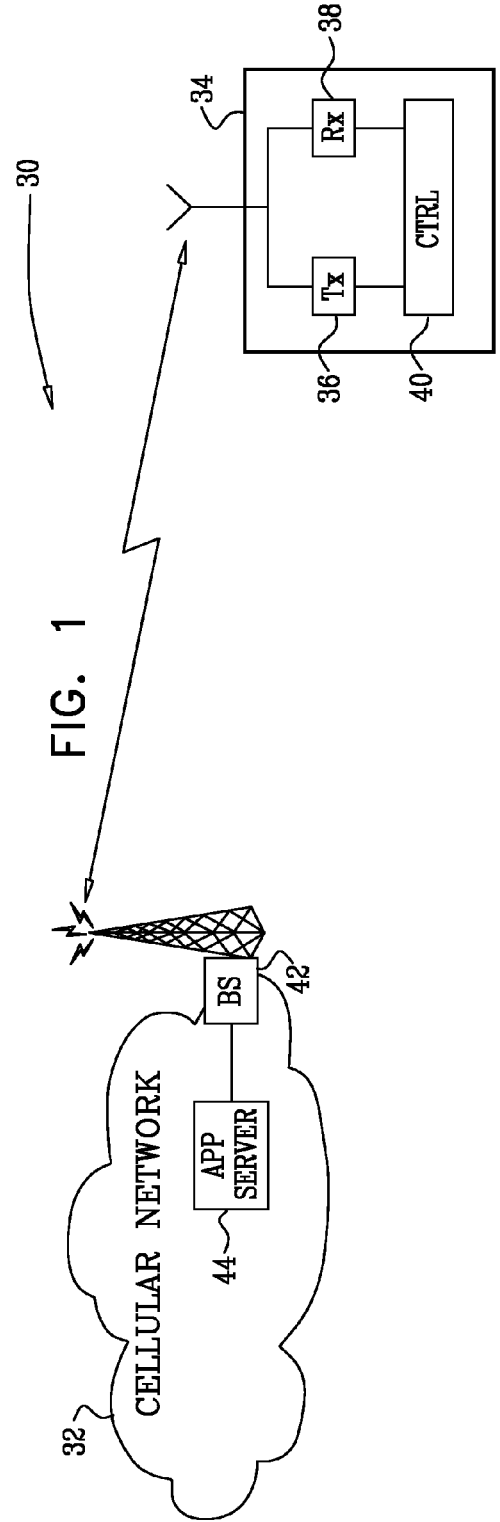
FIG. 1 is a block diagram that schematically illustrates a cellular communication system, in accordance with an embodiment of the present invention.

FIG. 1 is a block diagram that schematically illustrates a cellular communication system 30, in accordance with an embodiment of the present invention. System 30 is built around a cellular telephone network 32, but may comprise, alternatively or additionally, a personal communication system (PCS) or any other suitable public or private wireless network. Although the present embodiment is described hereinbelow with reference to aspects of cdma2000 cellular network standards, alternative embodiments of the present invention may be adapted for use with other wireless standards and protocols, such as cdmaone, 1xEVDO, UMTS, GSM or any other suitable standard. All of these standards provide for full-duplex communications between wireless terminals and base stations in the network.

A wireless half-duplex terminal 34 communicates over the air with a base station 42 in accordance with the protocols mandated by network 32. Uplink messages transmitted from terminal 34 to base station 42 are modulated, upconverted, filtered and amplified by a transmitter 36 to produce an uplink radio signal. Downlink messages transmitted from base station 42 to terminal 34 are received, downconverted, filtered, demodulated and otherwise processed by a receiver 38. The receiver and transmitter are coupled in parallel in a half-duplex hardware configuration, as is known in the art. The operations of transmitter 36 and receiver 38 are managed by a controller 40, so as to comply with the applicable network protocols while operating in half-duplex mode.

In the present embodiment, terminal 34 is designed for use in an application that involves digital messaging only, rather than voice communications, and which requires that the cost and power consumption of the terminal be minimized. Messages are carried between the terminal and base station 42 over signaling channels, i.e., the common paging (downlink) and access (uplink) channels, without using network traffic channels. One example of such an application is wireless tracking, in which terminal 34 is attached to a person or object and periodically transmits its location to an application server 44 in network 32. In such an application, terminal 34 can communicate with base station 42 over a common channel (i.e., a signaling channel), and half-duplex communication is sufficient to meet the application requirements. Other applications that can benefit from the low cost and low power consumption of such a half-duplex terminal will be apparent to those skilled in the art and are considered to be within the scope of the present invention.

The half-duplex communication model is useful, inter alia, in applications in which mobile wireless terminals operate in a hibernation cycle alternating between a hibernation mode and a wake mode. For example, terminal 34 may be a low-duty-cycle (LDC) device, which may be used in a variety of position tracking, tagging, telemetry and similar applications. LDC terminals operate in a hibernation cycle, whereby each terminal wakes-up to receive and transmit data for only a small percentage of the time. This low-duty-cycle operation minimizes the utilization of the air interface and further reduces energy consumption by the terminal. On the other hand, if a half-duplex LDC terminal, during its brief waking period, transmits an uplink access message while the base station is transmitting a downlink paging message, the terminal may fail to receive the downlink paging message. This potential problem is resolved by embodiments of the present invention.

Communication between base station 42 and terminals 34 (mobile stations) in network 32 can be initiated by either the base station 42 or the terminal 34. The base station 42 may initiate a connection by transmitting a downlink paging message addressed to the terminal 34. The terminal 34 may initiate a connection by transmitting an uplink access message to the base station 42. (The terms "paging" and "access" are taken from the terminology that is commonly used in CDMA network standards, but should be understood to refer generally to equivalent downlink and uplink signaling messages that are used in other types of wireless networks, as well.) The paging and access messages themselves may be used to carry data messages (such as SMS messages) between the base station 42 and the terminal 34.

Since network 32 is designed for full-duplex operation, there is no restriction in the network standards on the relative timing of the paging and access messages. In other words, a terminal may send an access message at any time, regardless of when the base station may transmit a paging message, and the access and paging messages may therefore overlap in time. Full-duplex terminals are capable of receiving the paging message notwithstanding the overlap. If base station 42 transmits a paging message to half-duplex terminal 34 while the terminal is transmitting an access message, however, the paging message will be lost.

Figure 2:
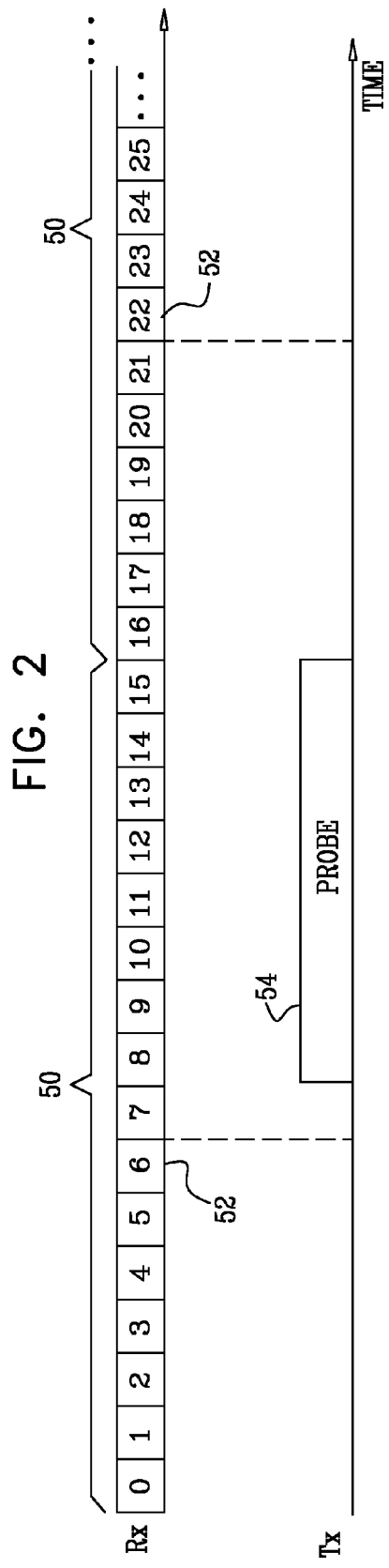
FIG. 2 is a timing diagram that schematically illustrates transmission times of paging and access probe messages, in accordance with an embodiment of the present invention.

FIG. 2 is a timing diagram that schematically illustrates a method used by terminal 34 in avoiding overlap of access and paging messages, in accordance with an embodiment of the present invention. As noted above, this embodiment uses features of cdma2000, which are described in standards promulgated by the 3rd Generation Partnership Project 2 "3GPP2" (available at www.3gpp2.org), including particularly *Medium Access Control (MAC) Standard for cdma2000 Spread Spectrum Systems* (specification C.S0003-0, version 3.0, 2001) and *Upper Layer (Layer 3) Signaling Standard for cdma2000 Spread Spectrum Systems* (specification C.S0005-0, Version 1.0, 1999), which are incorporated herein by reference.

Section 2.6.2.1.1.1.1 of specification C.S0005-0 describes a slotted mode, which may be used by terminals in the cdma2000 network. In order to conserve power, terminals are permitted to operate in the slotted mode while in an idle state. In this mode, the terminal monitors the paging channel only during certain assigned slots. In the example shown in FIG. 2, terminal 34 operates in accordance with a slot cycle 50 consisting of sixteen paging channel slots (each of which is 80 ms long), and is assigned to receive paging messages during one slot 52 in each cycle. The length of the slot cycle and the slot assigned to the terminal 34 in each cycle are identified in messages exchanged between the terminal 34 and the base station 42, using functions specified in the standard, which depend, inter alia, on the hard-coded electronic serial number of the terminal 34. Thus, in this example, there will be a known interval of 1.2 sec between the end of the assigned slot 52 in one cycle 50 and the beginning of the assigned slot in the next cycle. Controller 40 of terminal 34 is programmed to operate in accordance with the applicable parameters.

The procedure by which terminals may access the base station in the cdma2000 network is described in section 2.2.2.2.2.1.3 of specification C.20003-0. To access the base station 42, the terminal 34 transmits a sequence of access messages, referred to in the standard as "probes," of gradually increasing power, separated by certain time intervals. (The entire sequence of access probes is referred to as an "access attempt.") One access probe 54 is shown in FIG. 2. The duration and timing of the access slots during which terminals 34 may transmit access probes 54 are defined by configuration parameters that are transmitted by the base station 42 in an Access Parameters Message. In cdma2000, for example, the duration of each access slot may be between 80 and 520 ms. The interval between successive probes 54 is determined by the transmitting terminal 34, based on the access slots defined by the base station 42. In the worst case, the duration of the probe 54 (520 ms) is nearly half the length of the slot cycle in the present example. Thus, there is a high probability that the probe 54 will overlap with the receive slot that the terminal 34 is supposed to monitor. Even typical access slot lengths of 100-200 ms still give significant overlap probability.

In order to avoid this eventuality, in an embodiment of the present invention, controller 40 determines when to transmit probe 54 based on the known timing of slots 52. In other words, the controller times the probe transmission so that probes 54 will be transmitted only during access slots that fall in the interval between the paging channel slots assigned to terminal 34 in successive cycles 50. Thus, as shown in FIG. 2, the possibility of overlapping transmission and reception is eliminated. Although this pattern of probe transmission places certain constraints on the timing of access probes 54 transmitted by terminal 34, it can still be randomized sufficiently to avoid any ill effect on network performance. In any case, only terminal 34 deviates in its behavior from the standard, while base station 42 operates without change in full compliance with applicable standards.

Although the exemplary embodiment shown in FIG. 2 and described above uses certain specific timing parameters, the methods of this embodiment may likewise be applied using other timing parameters permitted by cdma2000 standards, as well as in the context of other wireless network types and standards that use slotted downlink transmission. It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for communication, comprising:
    deploying a half-duplex terminal in a full-duplex wireless communication network that supports only full-duplex terminals and is configured to permit simultaneous transmission of downlink paging messages and uplink access messages between a base station and the full-duplex terminals;
    assigning, to the half-duplex terminal, paging channel slots in a continuous cyclical sequence of the paging channel slots, so that the base station transmits the downlink paging messages to the half-duplex terminal only during the assigned paging channel slots;
    listening for a downlink paging message from the base station during the assigned paging channel slots;
    transmitting an uplink access message only during an interval bounded by the assigned paging channel slots;
    controlling the half-duplex terminal so that the half-duplex terminal transmits the uplink access message only during the interval bounded by the assigned paging channel slots occurring in successive cycles in the sequence; and
    initiating a connection from the half-duplex terminal to the base station in response to transmitting the uplink access message during the interval bounded by the assigned paging channel slots.

2. The method of claim 1, wherein the downlink paging message and uplink access message are transmitted on signaling channels of the network.

3. The method of claim 1, wherein assigning the half-duplex terminal paging channel slots comprises configuring the half-duplex terminal to monitor paging messages only during the assigned paging channel slots.

4. The method of claim 1, wherein the network is configured to operate in accordance with a CDMA network standard.

5. A half-duplex terminal for deployment in a full-duplex wireless communication network, the terminal comprising:
    a receiver operative to receive a downlink paging message from the full-duplex wireless communication network, the full-duplex wireless communication network supporting only full-duplex terminals and, including a base station configured to permit simultaneous transmission of a downlink paging message and reception of an uplink access message from the half-duplex terminal;
    a transmitter coupled in parallel with the receiver in a half-duplex configuration and is operative to the transmit an uplink access message to the base station; and
    a controller coupled to:
        the receiver to control the receiver so as to receive the downlink paging message during assigned paging channel slots in a continuous cyclical sequence of the paging channel slots; and
        the transmitter to control the transmitter so as to transmit the uplink access message only during an interval bounded by the assigned paging channel slots and initiate a connection to the base station in response to transmitting the uplink during the interval bounded by the assigned paging channel slots.

6. The terminal of claim 5, wherein the paging and access messages are on signaling channels.

7. The terminal of claim 5, wherein the controller is configured to monitor for paging messages only during the assigned slots.

8. The terminal of claim 5, wherein the network is configured to operate in accordance with a CDMA network standard.

9. A full-duplex wireless communication network comprising:
    a base station for supporting only full-duplex terminals and configured to simultaneously;
        transmit downlink paging messages during assigned paging channel slots in a continuous cyclical sequence of the paging channel slots to a half-duplex terminal; and
        receive uplink access messages from the half-duplex terminal; and
    half-duplex terminal comprising:

a receiver operative to receive a downlink paging message from the base station;

a transmitter coupled in parallel with the receiver in a half-duplex configuration and is operative to transmit an uplink access message to the base station; and a controller coupled:

to control the receiver so as to receive the downlink paging message during the assigned paging channel slots; and to control the transmitter so as to transmit the uplink access message only during an interval bounded by the assigned paging channel slots occurring in successive cycles in the continuous cyclical sequence and initiate a connection to the base station in response to transmitting the uplink access message during the interval bounded by the assigned paging channel slots.

10. A method with a half-duplex terminal, the method comprising:

deploying the half-duplex terminal in a full-duplex wireless communication network for supporting only full-duplex terminals and configured to permit simultaneous downlink paging and uplink access;

listening to the base station, during assigned paging channel slots in a continuous cyclical sequence of paging channel slots, for downlink paging messages paging the half-duplex terminal;

transmitting uplink access messages only during intervals bounded by the assigned paging channel slots; and initiating a connection from the half-duplex terminal to the base station in response to transmitting the uplink access message during the interval bounded by the assigned paging channel slots.

11. The method of claim 10, wherein the paging messages and access messages are on signaling channels.

12. The method of claim 10, wherein listening to the base station comprises listening to the base station only during assigned paging channel slots.

13. The method of claim 10, wherein listening to the base station comprises listening for the paging messages only during assigned paging channel slots.

14. The method of claim 10, wherein the network is configured to operate in accordance with CDMA network standards.

15. The method of claim 10, wherein the half-duplex terminal excludes usage of traffic channels.

16. The method of claim 10, wherein the half-duplex terminal is compliant with full-duplex network standards when the half-duplex terminal interoperates with the network.

17. A half-duplex wireless communication terminal for deployment in a full-duplex wireless communication network, the terminal comprising:

means for listening to a base station in a full-duplex wireless communication network that supports only full-duplex terminals and configured to permit simultaneous downlink paging and uplink access, during assigned paging channel slots in a continuous cyclical sequence of paging channel slots, for downlink paging messages paging the half-duplex terminal;

means for transmitting uplink access messages;

means for controlling transmission of the uplink access messages messages so that the half-duplex wireless communication terminal transmits the uplink access messages only during intervals bounded by the assigned paging channel slots; and means for initiating at least one connection from the half-duplex wireless communication terminal to the base station in response to transmitting the uplink access messages during the intervals bounded by the assigned paging channel slots.

* * * * *